United States Patent
Haraguchi et al.

(10) Patent No.: US 9,716,863 B2
(45) Date of Patent: Jul. 25, 2017

(54) LOAD CONTROL SYSTEM

(71) Applicant: Panasonic Intellectual Property Management Co., Ltd., Osaka (JP)

(72) Inventors: Taku Haraguchi, Mie (JP); Koichiro Kui, Mie (JP); Toshiharu Takenouchi, Osaka (JP); Koichiro Hashimoto, Mie (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 257 days.

(21) Appl. No.: 14/603,531

(22) Filed: Jan. 23, 2015

(65) Prior Publication Data

US 2015/0226829 A1   Aug. 13, 2015

(30) Foreign Application Priority Data

Feb. 10, 2014   (JP) .................................. 2014-023447

(51) Int. Cl.
*H04N 5/225*   (2006.01)
*H04N 7/18*    (2006.01)
*H04N 5/232*   (2006.01)

(52) U.S. Cl.
CPC ......... *H04N 7/183* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 6,236,037 | B1 | 5/2001 | Asada et al. |
| 6,995,664 | B1 * | 2/2006 | Darling ................ G08B 25/014 |
| | | | 340/10.1 |
| 7,006,080 | B2 | 2/2006 | Gettemy |
| | | | (Continued) |

FOREIGN PATENT DOCUMENTS

| | | |
|---|---|---|
| CN | 102970460 | 3/2013 |
| JP | 2008-042652 | 2/2008 |
| JP | 2008-293926 | 12/2008 |
| | (Continued) | |

OTHER PUBLICATIONS

Taiwanese Office Action dated Jan. 29, 2016, including search report, issued in corresponding Taiwanese Patent Application No. 104104330 and English translation thereof.
(Continued)

*Primary Examiner* — Dakshesh Parikh
(74) *Attorney, Agent, or Firm* — Renner, Otto, Boisselle & Sklar, LLP

(57) ABSTRACT

A load control system includes: an imaging sensor to capture an image of a target space and detect whether or not a human exists in a detection area in the space; and a display terminal including a display unit to display detection area information corresponding to the detection area thereon. The imaging sensor transmits a transmission signal containing area data indicative of the detection area to the transmission control device, and the transmission control device transmits a transmission signal containing the area data and an address of the display terminal to the display terminal, and the display terminal displays the detection area information on the display unit based on the area data.

7 Claims, 11 Drawing Sheets

(56) References Cited

U.S. PATENT DOCUMENTS

| | | | |
|---|---|---|---|
| 8,300,890 B1* | 10/2012 | Gaikwad | H04N 5/144 |
| | | | 382/103 |
| 2005/0046584 A1* | 3/2005 | Breed | B60C 11/24 |
| | | | 340/13.31 |

FOREIGN PATENT DOCUMENTS

| | | |
|---|---|---|
| JP | 2009-10520 | 1/2009 |
| JP | 2010-102900 | 5/2010 |
| JP | 2013-4490 | 1/2013 |
| JP | 2013-96947 | 5/2013 |
| JP | 2013-149361 | 8/2013 |

OTHER PUBLICATIONS

Korean Office Action dated Mar. 15, 2016 issued in corresponding Korean Patent Application No. 10-2015-0018401 and English summary thereof.

Korean Office Action dated Oct. 21, 2016 issued in corresponding Korean Patent Application No. 10-2015-0018401 and English summary thereof.

* cited by examiner

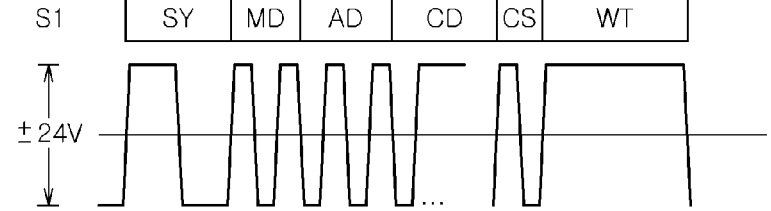
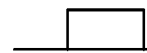
FIG. 7A
FIG. 7B
FIG. 7C

LOAD CONTROL SYSTEM

CROSS-REFERENCE TO RELATED APPLICATION

This application claims priority to Japanese Patent Application No. 2014-023447, the entire contents of which are incorporated herein by reference.

TECHNICAL FIELD

The present disclosure relates to a load control system, and particularly to a load control system including an imaging sensor to detect whether or not a human exists in a detection area.

BACKGROUND ART

A load control system including a human-detecting sensor (imaging sensor) for detecting whether or not a human exists in a detection area has been known. For example, Japanese Unexamined Patent Application Publication No. 2013-096947 (JP2013-096947A) describes a load control system which includes an imaging sensor, a control unit and lamp loads. The imaging sensor divides an image of a detection area into sub-areas to determine whether or not a human exists and how many humans exist, if any, for each of the sub-areas. Additionally, in the imaging sensor, location information on each sub-area is set by a setting unit. The control unit generates a control instruction for each of the lamp loads based on human-detecting information transmitted from the imaging sensor via a transmission line and transmits the generated control instruction to each of the lamp loads via a signal line. The lamp load includes a lighting source such as an incandescent lamp, a fluorescent lamp, or an LED lamp, and a lighting device for lighting on/off and dimming the lighting source pursuant to the control instruction.

In addition, the control unit controls the lamp loads corresponding to the respective sub-areas based on the human-detecting information and brightness levels for each of the sub-areas transmitted from the imaging sensor.

In the conventional load control system disclosed in JP2013-096947A, the detection area of the imaging sensor is set by an installation technician by manipulating a switch provided in the imaging sensor or a dedicated setting unit. In addition, the set detection area cannot be checked without using the setting unit. Accordingly, in the conventional load control system, the setting unit needs to be prepared whenever the set detection area is checked, and thus, checking the detection area becomes complicated.

SUMMARY OF THE INVENTION

In view of the above, the present disclosure provides a load control system allowing a user to easily check a detection area of an imaging sensor.

In accordance with an aspect of the present invention, there is provided a load control system including: an imaging sensor configured to capture an image of a space to be detected and detect whether or not a human exists in a detection area in the space; a display terminal including a display unit configured to display detection area information corresponding to the detection area thereon; and a transmission control device to which the imaging sensor and the display terminal are connected through a two-wire signal line.

The imaging sensor is configured to transmit a transmission signal containing area data indicative of the detection area to the transmission control device through the two-wire signal line. The transmission control device is configured to transmit a transmission signal which contains the area data and address data corresponding to an address of the display terminal to the display terminal through the two-wire signal line transmission signal. The display terminal is configured to display the detection area information on the display unit based on the area data.

The display terminal is preferably configured to display the detection area on the display unit stepwisely based on a size of the detection area.

The detection area information may include image blocks arranged in a matrix form and the image blocks correspond to blocks of the detection area.

The display terminal may further include a changing unit configured to generate change data based on an input operation of the changing unit. The display terminal is preferably configured to transmit a transmission signal containing the change data to the transmission control device through the two-wire signal line. The transmission control device is preferably configured to transmit a transmission signal which contains the change data and address data corresponding to an address of the imaging sensor to the imaging sensor through the two-wire signal line. The imaging sensor is preferably configured to change the detection area based on the change data.

The display unit may contain a touch panel, and the changing unit is preferably configured to generate the change data based on the input operation received through the touch panel.

The display terminal may further include a switching unit configured to switch an operation mode of the display unit between a first mode in which the detection area information is displayed on the display unit and a second mode in which a detection result of the imaging sensor is displayed on the display unit based on an input operation of the switching unit.

The load control system further includes: a control terminal configured to control a load connected thereto. The imaging sensor is preferably configured to transmit another transmission signal containing monitor data indicative of a detection result of the imaging sensor to the transmission control device through the two-wire signal line. The transmission control device is preferably configured to generate control data for the load based on the monitor data and to transmit a transmission signal which contains the control data and address data corresponding to an address of the control terminal to the control terminal through the two-wire signal line. The control terminal is preferably configured to control the load based on the control data.

In accordance with the aspects of the present invention, the display terminal displays the detection area information on the display unit based on the area data transmitted from the imaging sensor. Therefore, the present invention allows a user to easily check the detection area of the imaging sensor by way of simply watching the display terminal.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 7A is a diagram illustrating a format of a transmission signal in the load control system, FIG. 7B is a waveform diagram of a transmission signal in the load control system, and FIG. 7C is a waveform diagram of an interrupt signal in the load control system.

DETAILED DESCRIPTION

Figure 1:
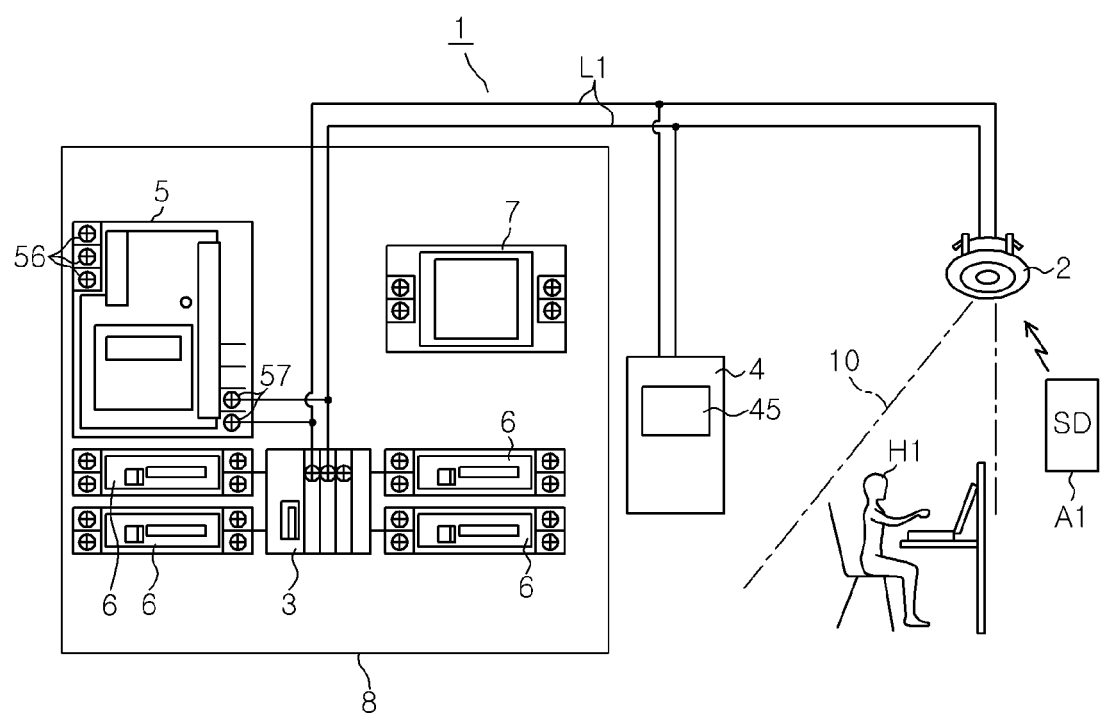
FIG. 1 is a schematic block diagram of a load control system.

A load control system 1 in accordance with an embodiment of the present invention includes an imaging sensor 2, a display terminal 4, and a transmission control device 5, as shown in FIG. 1. The image sensor 2 captures an image of a space to be detected and also detects whether or not a human H1 exists in a detection area 10 set in the space. The display terminal 4 includes a display unit 45 on which detection area information corresponding to the detection area 10 is displayed. The transmission control device 5 is connected to the imaging sensor 2 and the display terminal 4 via a two-wire signal line L1.

The imaging sensor 2 transmits a transmission signal S1 containing area data indicative of the detection area 10 to the transmission control device 5 through the signal line L1. The transmission control device 5 transmits a transmission signal S1 (see FIG. 7A) containing the area data transmitted from the imaging sensor 2 and address data AD corresponding to an address of the display terminal 4 to the display terminal 4 through the signal line L1. The display terminal 4 displays the detection area 10 (i.e., the detection area information) on the display unit 45 based on the area data.

As such, the load control system 1 in accordance with the embodiment of the present invention allows a user to check the detection area 10 of the imaging sensor 2 by way of simply watching the display terminal 4, and thus the user can easily check the detection area 10 of the imaging sensor 2.

Hereinafter, the load control system 1 in accordance with the present embodiment will be described in detail with reference to corresponding drawings. It is to be noted that the descriptions given below are merely illustrative, and the present invention is not limited to the embodiments to be described below. In addition to the embodiments, other modifications can be made depending on design choices unless such modifications depart from the technical scope of the present invention.

As shown in FIG. 1, the load control system 1 in accordance with the embodiment of the present invention includes the image sensor 2, a control terminal 3 controlling a load, the display terminal 4, the transmission control device 5, a plurality of relays 6 (e.g., four relays in FIG. 1), and a remote controller transformer 7. Although the control terminal 3, the transmission control device 5, the relays 6 and the remote controller transformer 7 are disposed in a distribution board (or a relay control board) 8 of the load control system 1 in accordance with the present embodiment, the arrangement thereof is not limited thereto.

The transmission control device 5 includes three terminals (two power terminals and one earth terminal) 56 and two signal terminals 57, as shown in FIG. 1. The transmission control device 5 is connected to an AC power source (not shown), e.g., via a single-phase three-wire line (not shown) connected to the terminals 56. Further, the two signal terminals 57 of the transmission control device 5 are connected to the two-wire signal line L1. Each of the imaging sensor 2, the control terminal 3 and the display terminal 4 includes terminals to be connected to the signal line L1. In addition, each of the imaging sensor 2, the control terminal 3 and the display terminal 4 is connected to the signal line L1. Although the load control system 1 in accordance with the present embodiment includes one imaging sensor 2, one control terminal 3 and one display terminal 4, the load control system 1 may include each of them in a plural number.

Figure 2:
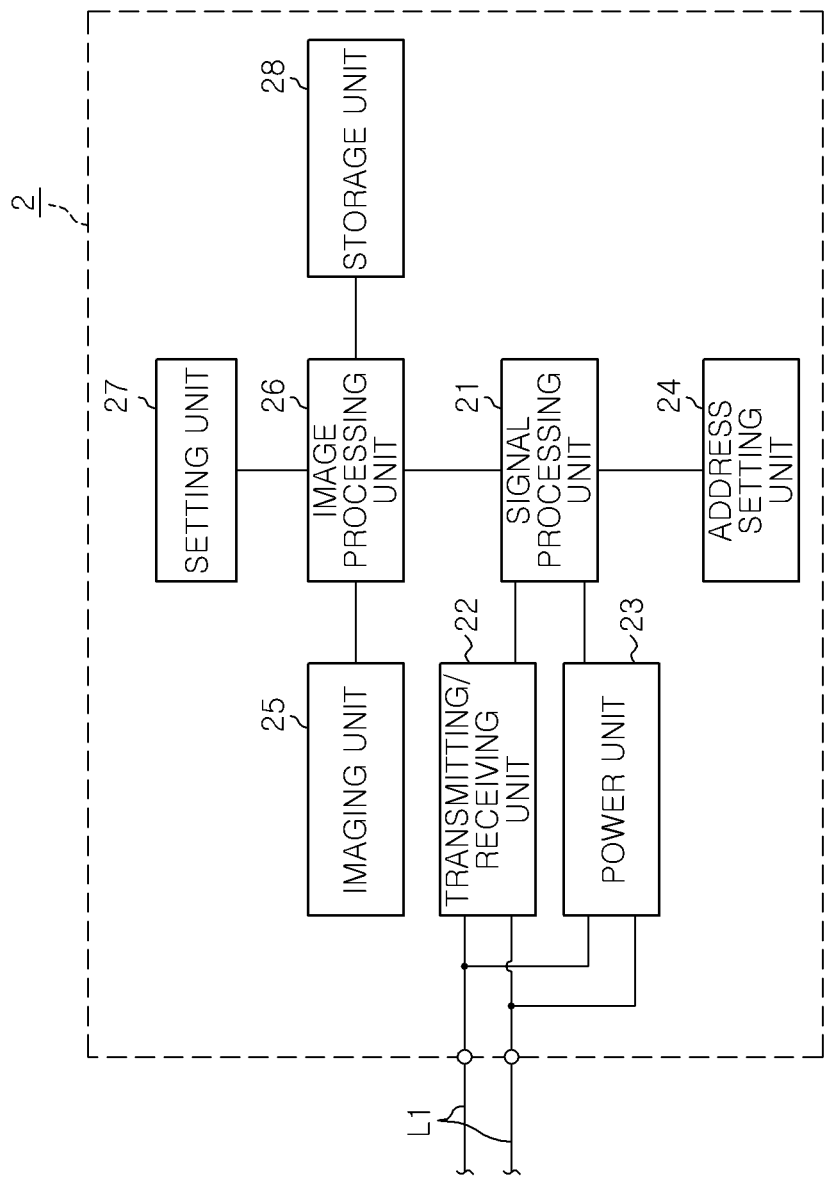
FIG. 2 is a block diagram of an imaging sensor in the load control system.

The imaging sensor 2 is installed, e.g., at a ceiling of an office. The image sensor 2 captures space to be detected and detects whether or not a human H1 exists within the detection area 10 (see FIG. 7B) from consecutively captured images. If the load controlled by the control terminal 3 is a lamp load, it is desirable to set the detection area 10 to be a space illuminated by the lamp load. The imagining sensor 2 includes a signal processing unit 21, a transmitting/receiving unit 22, a power unit 23, an address setting unit 24, an imaging unit 25, an image processing unit 26, a setting unit 27 and a storage unit 28, as shown in FIG. 2.

The signal processing unit 21 includes e.g., a microcomputer and is connected to the signal line L1 via the transmitting/receiving unit 22. The microcomputer of the signal processing unit 21 has an appropriate program installed therein. The transmitting/receiving unit 22 receives a bipolar transmission signal S1 transmitted through the signal line L1, and depolarizes (i.e., full-wave rectifies) and transmits the received signal to the signal processing unit 21.

In addition, a signal to be returned from the signal processing unit 21 to the transmission control device 5 is converted into a current-mode signal in the transmitting/receiving unit 22 to be sent out to the signal line L1. In this regard, the current-mode signal refers to a signal that is sent out by short-circuiting the signal line L1 via an appropriate low-impedance. The power unit 23 obtains an internal power for the imaging sensor 2 from the transmission signal S1 transmitted through the signal line L1. The address setting unit 24 includes, e.g., a non-volatile memory and is used to set a unique address of the imaging sensor 2 and store it.

The imaging unit 25 includes an imaging element (not shown) and an A/D converter (not shown) that converts an analog image signal into a digital image signal (image data) to output it. The imaging element contains light-receiving units (sensor units) arranged in a two-dimensional matrix, each of the light-receiving units configuring an individual pixel. Although a CMOS (Complementary MOS) image sensor is employed as the imaging element, it is not limited thereto. For example, a CCD (Charge Coupled Device) image sensor may be employed as the imaging element. In terms of saving power consumption, a CMOS image sensor is preferable compared to a CCD image sensor for the imaging element. In addition, the imaging unit 25 includes a lens (not shown). The lens is provided, e.g., to adjust a view of each of the light-receiving units.

The image processing unit 26 includes, e.g., a microcomputer, a DSP (Digital Signal Processor) or the like. The image processing unit 26 performs various types of imaging processing on image data acquired from the imaging unit 25 and also performs determination processing of determining whether a human H1 exists or not based on a result of the image processing. The setting unit 27 configures an interface to receive various types of information from an external setting device (SD) A1 (see FIG. 1) and performs wireless communications with the setting device A1.

The storage unit 28 includes a rewritable and non-volatile memory. The non-volatile memory may be, e.g., a flash memory. The storage unit 28 stores therein various types of information necessary for the image processing unit 26 to perform the image processing and the determination processing. The storage unit 28 stores therein image data of the detection area 10 captured when no human H1 exists in the detection area 10, as background image data.

The image processing unit 26 generates a difference image which is a difference between the background image data and image data sequentially outputted from the imaging unit 25 and performs extraction processing of pixel areas corresponding to an outline of a human H1 or an area of the human H1 (hereinafter, referred to as "human pixel area") from the difference image. Then, the image processing unit 26 determines that there exists a human H1 when the human pixel area is extracted during the extraction processing. The difference image includes pixels each of which value is a difference of corresponding pixels of the image data and the background image data. The image processing unit 26 may generate a difference image from two sequential image frames, rather than generating a difference image between the image data and the background image data. Further, in the image sensor 2 in accordance with the present embodiment, the imaging unit 25 outputs images at 30 frames per second. However, the time interval at which the imaging unit 25 captures images is not limited thereto.

Additionally, the image processing unit 26 obtains a representative position in the human pixel area and determines the behavior of a human H1 (staying, moving or the like) by comparing a distance by which the representative position is displaced during a predetermined time period (i.e., in a predetermined number of frames) with a threshold value. In other words, the image processing unit 26 determines that the human is staying in the same place if the distance is less than the threshold value whereas it determines that the human is moving if the distance is equal to or greater than the threshold value.

In this regard, the representative position refers to a central position of the human pixel area or a position of a particular part of the human H1 (the head, for example). When a difference image is produced from two image frames, the image processing unit 26 may not be able to extract the human pixel area when the human H1 stays still. In contrast, when a difference image is produced between image data and background image data, the image processing unit 26 is able to extract the human pixel area even when the human H1 stays still. Further, the image processing unit 26 determines the number of humans H1 in the detection area 10 based on the number of extracted human pixel areas.

As described above, the load control system 1 in accordance with the present embodiment employs the image sensor 2 instead of a pyroelectric infrared ray sensor, and thus the behavior of the human H1 (staying, moving or the like) can be detected as well as existence of the human H1 in the detection area 10. Further, the signal processing unit 21 generates monitor data indicative of a detection result of the image sensor 2 based on a determination result of the image processing unit 26 and transmits the monitor data from the transmitting/receiving unit 22 to the signal line L1.

Figure 3:
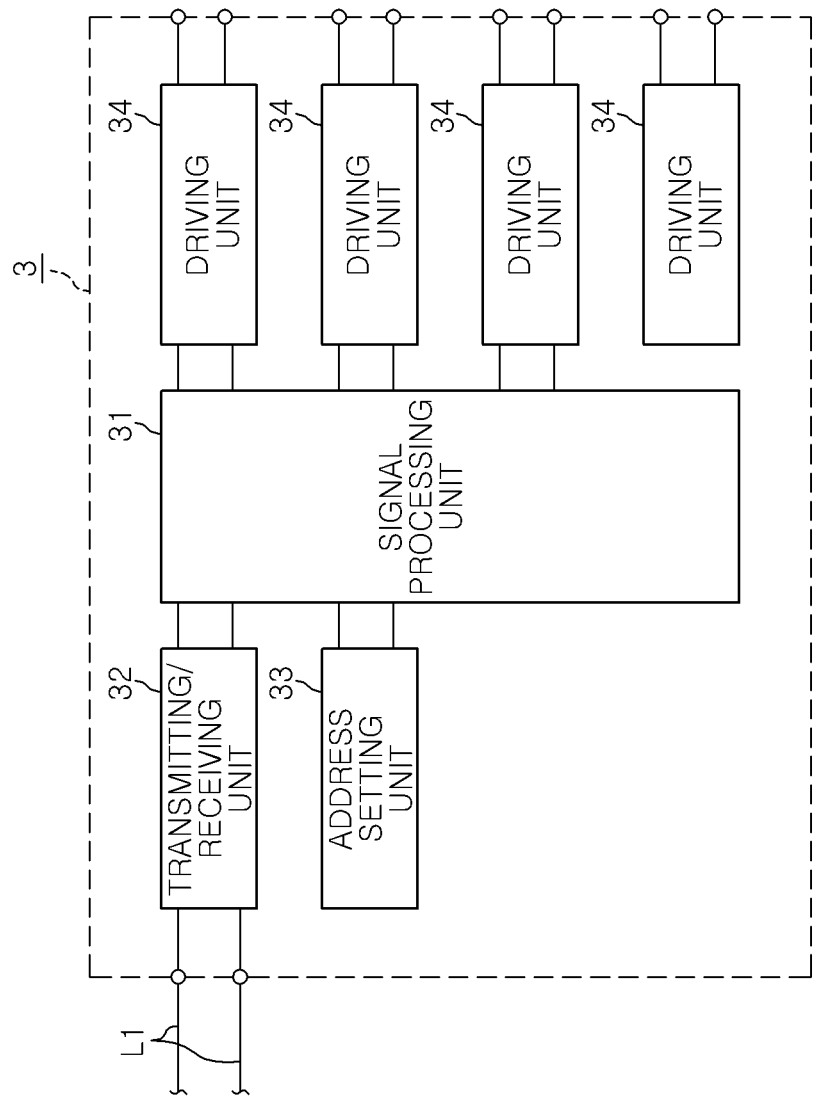
FIG. 3 is a block diagram of a control terminal in the load control system.

The control terminal 3 is connected to a load (not shown) such as a lamp load to control the load. The control terminal 3 includes a signal processing unit 31, a transmitting/receiving unit 32, an address setting unit 33 and driving units 34, as shown in FIG. 3.

The signal processing unit 31 includes, e.g., a microcomputer and is connected to the signal line L1 via the transmitting/receiving unit 32. The microcomputer of the signal processing unit 31 has an appropriate program installed therein. The transmitting/receiving unit 32 receives a bipolar transmission signal S1 transmitted through the signal line L1, and depolarizes and transmits the received signal to the signal processing unit 31. In addition, a signal to be returned from the signal processing unit 31 to the transmission control device 5 is converted into a current-mode signal in the transmitting/receiving unit 32 and is outputted to the signal line L1. The address setting unit 33 includes, e.g., a non-volatile memory and is used to set a unique address of the control terminal 3 and store it.

The control terminal 3 is connected to relays 6 (four relays in FIG. 1). The driving units 34 are provided in the terminal 3 in plural (four in FIG. 3) to respectively drive the relays 6. The relays 6 are, e.g., a latching type and are connected to a series circuit of the AC power source such as a commercial power source and the load. Accordingly, each driving unit 34 of the control terminal 3 controls the corresponding relay 6 such that a power feeding line connecting the AC power source to the load is opened or closed to thereby switch the load between on-state and off-state. Further, when the control terminal 3 controls the relays 6, the remote controller transformer 7 supplies to the relays 6 a power in a pulse form. The remote controller transformer 7 is connected to the AC power source and transforms an AC voltage of 100 V into an AC voltage of 24 V to supply the AC power of 24 V to the relays 6 and the control terminal 3.

The control terminal 3 is given 2-bit load numbers to individually identify the relays 6. Hereinafter, the load number and a channel of the control terminal 3 are collectively referred to as an address. In other words, in the load control system 1 in accordance with the present embodiment, each of the relays 6 is assigned with an individual address. Further, in the load control system 1, an imaging sensor 2 and a control terminal 3 corresponding to each other are set to be in the same channel, so that the corresponding relationship can be easily recognized. Accordingly, the control terminal 3 controls a relay 6 having a load number corresponding to that contained in address data AD (see FIG. 7A), thereby turning on or off the load.

As the control terminal 3, a terminal for dimming control may also be employed. As the terminal for dimming control, a terminal that is capable of generating dimming data may be employed, for example. In this instance, an LED illumination apparatus may be employed as a load, which includes a light source having LEDs (Light Emission Diodes) and a lighting device capable of dimming the light source based on the dimming data.

Figure 4:
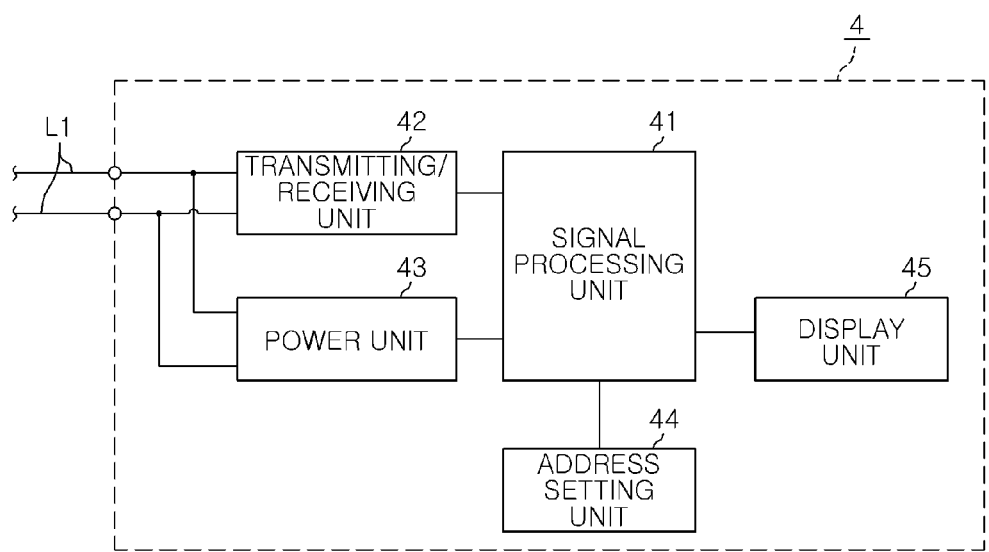
FIG. 4 is a block diagram of a display terminal in the load control system.

The display terminal 4 is disposed at a wall of an office or the like. The display terminal 4 includes a signal processing unit 41, a transmitting/receiving unit 42, a power unit 43, an address setting unit 44 and a display unit 45, as shown in FIG. 4.

The signal processing unit 41 includes, e.g., a microcomputer and is connected to the signal line L1 via the transmitting/receiving unit 42. The microcomputer of the signal processing unit 41 has an appropriate program installed therein. The transmitting/receiving unit 42 receives a bipolar transmission signal S1 transmitted through the signal line L1, and depolarizes and transmits the received signal to the signal processing unit 41. In addition, a signal to be returned from the signal processing unit 41 to the transmission control device 5 is converted into a current-mode signal in the transmitting/receiving unit 42 and is outputted to the signal line L1. The power unit 43 obtains an internal power for the display terminal 4 from the transmission signal S1 transmitted through the signal line L1. The address setting unit 44 includes, e.g., a non-volatile memory and is used to set a unique address of the display terminal 4 and store it.

Figure 5A:
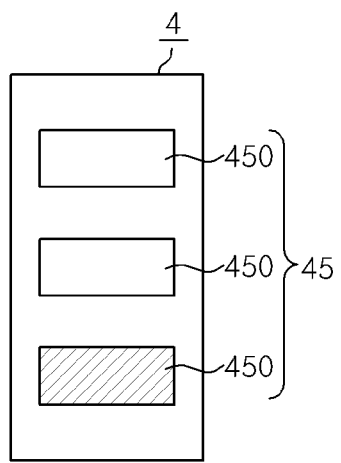
FIGS. 5A to 5C are diagrams illustrating examples of a display unit in the load control system.
Figure 5B:
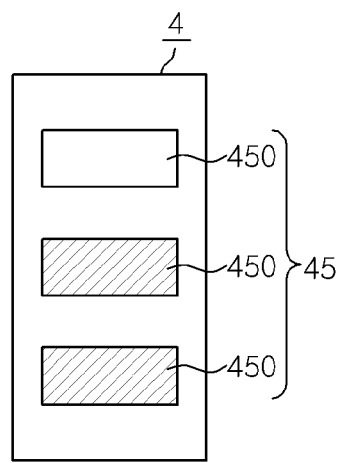
Figure 5C:
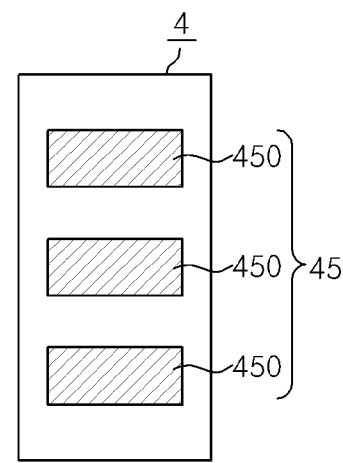

The display unit 45 displays the detection area 10 of the imaging sensor 2. In the load control system 1 in accordance with the present embodiment, the display unit 45 includes light transmitting portions (three light transmitting portions in the present embodiment) 450, as shown in FIG. 5A to 5C, and light-emitting elements (three light-emitting elements in the present embodiment) (not shown). The light transmitting portions 450 are made of a material having transparency (e.g., acryl resin or polycarbonate resin) and are arranged in a direction (the vertical direction in FIG. 5A). The light-emitting elements include, e.g., LEDs or EL (ElectroLuminescence) elements and are provided in the body of the display terminal 4 to face respective light transmitting portions 450. In addition, in FIGS. 5A to 5C, lights emitted from the light-emitting elements are outputted through the hatched ones of the light transmitting portions 450.

Figure 6:
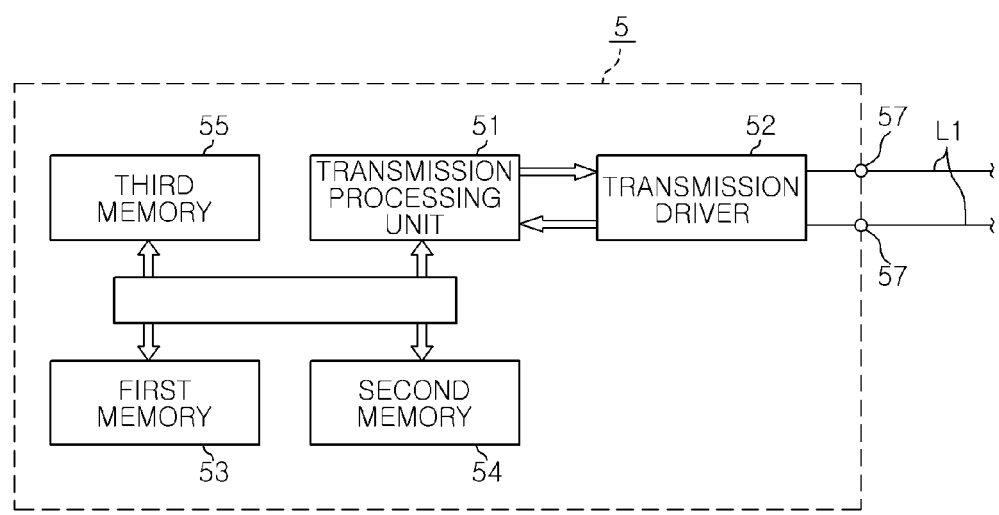
FIG. 6 is a block diagram of a transmission control device in the load control system.

The transmission control device 5 transmits the transmission signal S1 (see FIGS. 7A to 7C) containing address data among the imaging sensor 2, the control terminal 3 and the display terminal 4 through the signal line L1. The transmission control device 5 includes a transmission processing unit 51, a transmission driver 52, a first memory 53, a second memory 54 and a third memory 55, as shown in FIG. 6.

The transmission processing unit 51 includes, e.g., a microcomputer and is connected to the signal line L1 via the transmission driver 52. The transmission processing unit 51 generates control data and monitors states of the imaging sensor 2, the control terminal 3 and the display terminal 4. The transmission driver 52 transmits and receives signals to/from the imaging sensor 2, the control terminal 3 and the display terminal 4 through the signal line L1 under the control of the transmission processing unit 51. The first memory 53 includes, e.g., a ROM (Read Only Memory) and stores therein an operation program of the transmission processing unit 51. The second memory 54 includes a non-volatile memory such as EEPROM (Electrically Erasable Programmable Read Only Memory). The second memory 54 stores therein a relationship among the imaging sensor 2, the control terminal 3 and the display terminal 4 as a table format. The third memory 55 includes, e.g., a RAM (Random Access Memory) and stores therein data transmitted among the imaging sensor 2, the control terminal 3 and the display terminal 4.

In the load control system 1 in accordance with the present embodiment, the imaging sensor 2, the control terminal 3 and the display terminal 4 are assigned with their own addresses. In addition, the transmission control device 5 manages the corresponding relationship among the addresses of the imaging sensor 2, the control terminal 3 and the display terminal 4. The transmission control device 5 individually identifies the imaging sensor 2, the control terminal 3 and the display terminal 4 based on their addresses.

FIG. 7A shows a format of the transmission signal S1. The transmission signal S1 includes a start pulse signal SY, mode data MD, address data AD, control data CD, checksum data CS, and a signal-returning time WT. The start pulse signal SY is a signal indicative of the initiation of signal transfer. The mode data MD indicates a mode of the transmission signal S1. The address data AD is used for individually calling the imaging sensor 2, the control terminal 3 and the display terminal 4. The control data CD is used for controlling the control terminal 3 and the display terminal 4, as well as the relays 6 and the load. The checksum data CS is used for detecting transmission errors. The signal-returning time WT is a time slot within which return signals from the imaging sensor 2, the control terminal 3 and the display terminal 4 are received. The transmission signal S1 is a time-division multiplexing signal having two polarities (±24V). Data contained in the transmission signal S1 is transmitted using a pulse-width modulation (see FIG. 7B).

Now, the operation of the transmission control device 5 will be described. When transmitting data to one of the imaging sensor 2, the control terminal 3 and the display terminal 4, the transmission control device 5 sets the mode data MD to a control mode and sends a transmission signal S1 having the address of a desired device as the address data AD. Then, a device having the address corresponding to the address data AD receives the control data CD and returns monitor data within the signal-returning time WT. The transmission control device 5 checks if the control data CD has been transmitted to the desired device based on a relationship between the sent control data CD and the monitor data received within the signal-returning time WT.

Normally, the transmission control device 5 sends out transmission signals S1 having the mode data MD set to a dummy mode at a regular time interval (i.e., performs polling). When one of the imaging sensor 2, the control terminal 3 and the display terminal 4 is to transmit data to the transmission control device 5, the device issues an interrupt signal in synchronization with the start pulse signal SY of the transmission signal S1 in the dummy mode, as shown in FIG. 7C. At this time, the device having issued the interrupt signal sets an interrupt flag to prepare future information communications with the transmission control device 5.

Upon receiving the interrupt signal, the transmission control device 5 sets the mode data MD to an interrupt polling mode and also sends out the transmission signal S1 while increasing sequentially the upper half bits of the address data AD (upper four bits in case of 8-bit address data AD). The device having issued the interrupt signal returns the lower half bits of its address to the transmission control device 5 during the signal-returning time WT, when the upper four bits of the address data AD of the transmission signal S1 coincides with the upper four bits of its address. In this manner, the transmission control device 5 can identify the device having issued the interrupt signal.

Upon receiving the address of the device having issued the interrupt signal, the transmission control device 5 sets the mode data MD to a monitoring mode and sends the transmission signal S1 having the received address data AD to the signal line L1. Then, in response to this transmission signal S1, the device having issued the interrupt signal returns desired information (e.g., monitor data) within the signal-returning time WT.

Finally, the transmission control device 5 sends a signal to instruct an interrupt reset to the device having issued the interrupt signal and cancels the interrupt flag of the corresponding device. In this manner, data transfer from one of the imaging sensor 2, the control terminal 3 and the display terminal 4 to the transmission control device 5 is carried out.

Within an imaging area X1 of the imaging sensor (see FIG. 8B), positions where a human H1 cannot exist (positions where office equipment such as a desk, a bookshelf and a copy machine is installed) may be included. It is preferable to exclude such positions from the detection target to avoid an incorrect operation of the load due to erroneous detection of a human H1. In other words, by setting the areas where a human H1 can exist in the imaging area X1 of the imaging sensor 2 as the detection area 10, erroneous detection of a human H1 can be reduced.

Figure 8A:
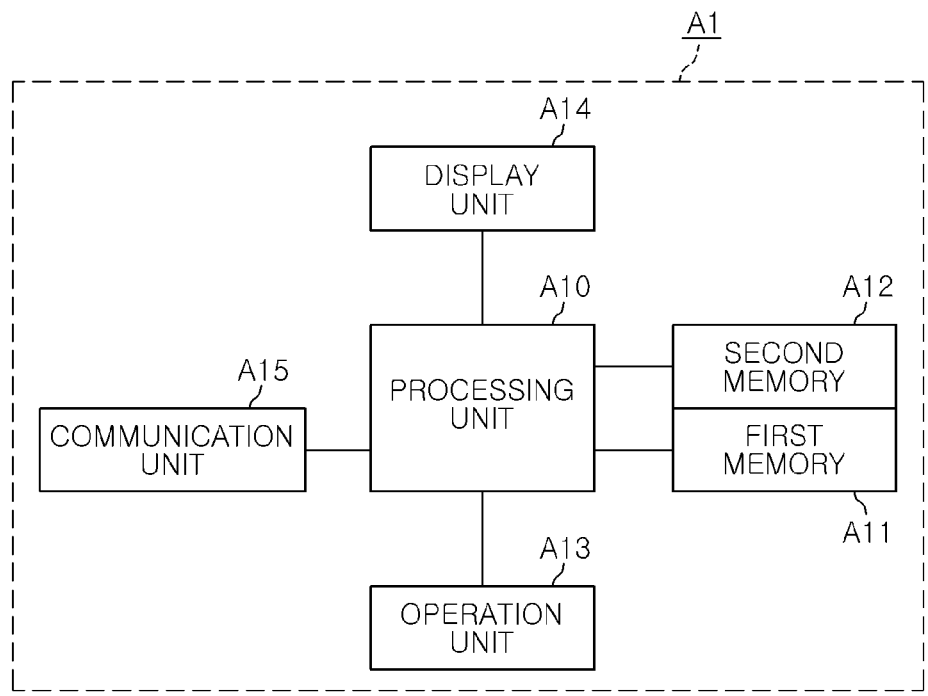
FIG. 8A is a block diagram of a setting device.
Figure 8B:
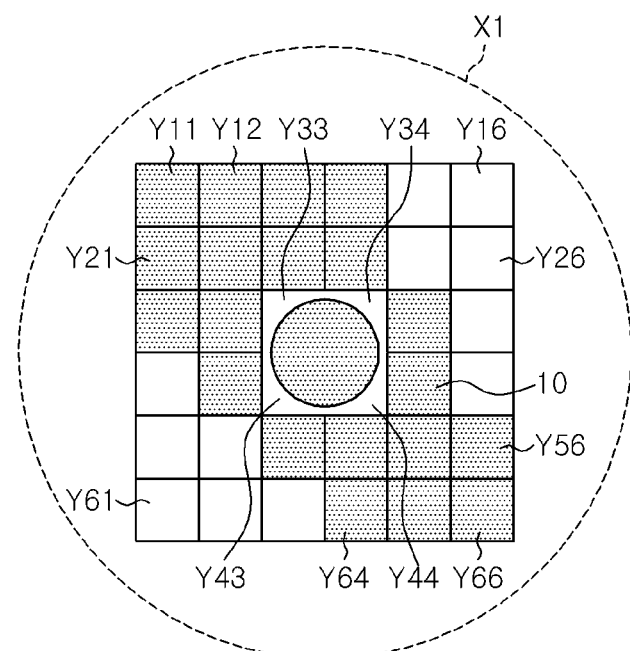
FIG. 8B is a diagram illustrating a detection area in the load control system.

Now, the detection area 10 will be described. In the load control system 1 in accordance with the present embodiment, thirty-six blocks Y11 to Y66 arranged in a six-by-six matrix are set in the imaging area X1, as shown in FIG. 8B. Thirty-two blocks among the blocks Y11 to Y66, excluding four blocks Y33, Y34, Y43 and Y44 in the center, are designated as being effective or ineffective for detection. The four blocks Y33, Y34, Y43 and Y44 in the center are always designated as being effective for detection. In FIG. 8B, blocks designated as being effective (referred to hereinafter as "effective blocks") are depicted as blocks with black dots, whereas blocks designated as being ineffective (referred to hereinafter as "ineffective blocks") are depicted as white blocks. Further, a set of the effective blocks corresponds to the detection area 10. Further, each of the blocks includes a plurality of pixels of imaging elements (e.g., nine (=3×3) pixels).

Setting of the detection area 10 is generally carried out by an installation technician using a dedicated setting device A1. The setting device A1 includes a processing unit A10, a first memory A11, a second memory A12, a manipulation unit A13, a display unit A14, and a communications unit A15, as shown in FIG. 8A. The processing unit A10 includes, e.g., a microprocessor and performs processes to set the detection area 10 of the imaging sensor 2. The first memory A11 is configured with, e.g., a ROM and stores therein an operation program of the processing unit A10. The second memory A12 is configured with, e.g., a RAM and temporarily stores various types of data therein while the processing unit A10 executes programs.

The manipulation unit A13 includes switches (such as button switches) and, when a switch is operated, outputs an operation signal associated with the switch to the processing unit A10. The display unit A14 includes an LCD (Liquid Crystal Display (not shown)) and a driver (not shown) to display various symbols, characters, figures and the like on the LCD under the control of the processing unit A10. The communications unit A15 performs wireless communications between itself and the setting unit 27 of the imaging sensor 2.

Now, the setting of the detection area 10 will be described. Initially, an installation technician manipulates the manipulation unit A13 of the setting device A1 to send the imaging sensor 2 a command to request area data indicative of the detection area 10. Upon receiving the command, the imaging sensor 2 reads out area data from the storage unit 28 to send it to the setting device A1. Upon receiving the area data, the setting device A1 displays the blocks Y11 to Y66 on the display unit A14 based on the area data. While checking the blocks Y11 to Y66 displayed on the display unit A14, the installation technician operates the manipulation unit A13 to select one block to be set from among the blocks Y11 to Y66 and designates it as being effective or ineffective. The installation technician repeats this process to set the detection area 10 and then manipulates the manipulation unit A13 to complete the setting of the detection area 10.

The setting device A1 sends updated area data to the imaging sensor 2 whenever each of the blocks Y11 to Y66 is designated as being effective or ineffective or when the setting of the detection area 10 is completed. Upon receiving the updated area data, the imaging sensor 2 overwrites existing area data stored in the storage unit 28 with the received area data. By doing so, the detection area 10 of the imaging sensor 2 is updated based on the area data set by the setting device A1.

Alternatively, the detection area 10 may be set in such a manner that the installation technician manipulates the manipulation unit A13 of the setting device A1 to select one pattern among pre-defined types of patterns. For example, the detection area 10 may be set by selecting one pattern among the three patterns shown in FIGS. 9A to 9C. In the pattern shown in FIG. 9A, four (=2×2) blocks among the blocks Y11 to Y66 are selected as the detection area 10. In the pattern shown in FIG. 9B, sixteen (=4×4) blocks among the blocks Y11 to Y66 are selected as the detection area 10. In the pattern shown in FIG. 9C, all of the blocks Y11 to Y66 are selected as the detection area 10. It is to be understood that the pattern of the detection area 10 is not limited to the patterns shown in FIGS. 9A to 9C but may include various other patterns.

In the conventional load control system, the detection area 10 of the imaging sensor 2 could not be checked without using the setting device A1. Accordingly, the setting device A1 needs to be prepared whenever the detection area 10 is checked, which makes the checking task of the detection area 10 to be complicated. Additionally, the setting device A1 is typically carried by an installation technician, and thus a user needs to contact the installation technician in order to check the detection area 10.

In view of this, in the load control system 1 in accordance with the present embodiment, the display terminal 4 connected to the two-wire signal line L1 is provided, and, in the display terminal 4, the display unit 45 displaying the detection area 10 is provided.

Now, a process to display the detection area 10 on the display unit 45 will be described. The imaging sensor 2 issues an interrupt signal when the area data is updated. Upon recognizing the imaging sensor 2 in the interrupt polling mode, the transmission control device 5 sends a transmission signal S1 having the address data AD of the imaging sensor 2 to the signal line L1 in the monitoring mode. In response to the transmission signal S1, the imaging sensor 2 returns the area data within the signal-returning time WT. In other words, the imaging sensor 2 transmits a transmission signal S1 containing the area data indicative of the detection area to the transmission control device 5 through the signal line L1.

Subsequently, in the control mode, the transmission control device 5 having received the area data sends out a transmission signal S1 having the area data as the control data CD and the address of the display terminal 4 as the address data AD. In other words, the transmission control device 5 transmits the transmission signal S1 containing the area data transmitted from the imaging sensor 2 and the address data AD corresponding to the address of the display terminal 4 to the display terminal 4 through the signal line L1. Then, upon receiving the transmission signal S1, the display terminal 4 displays the detection area 10 on the display unit 45 based on the area data.

Figure 9A:
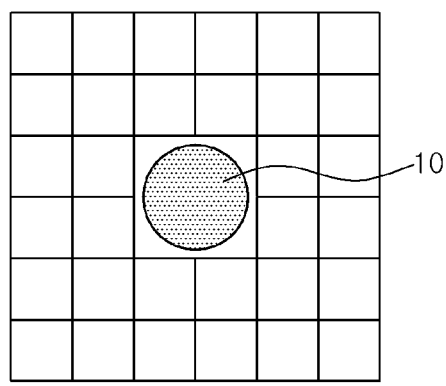
FIGS. 9A to 9C are diagrams illustrating examples of the detection area in the load control system.
Figure 9B:
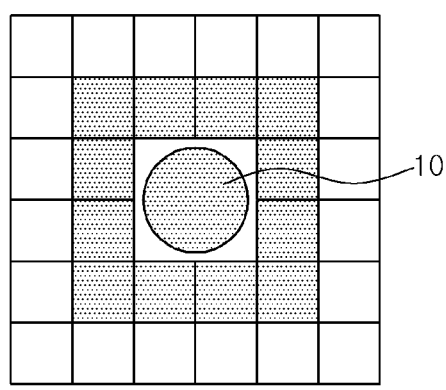
Figure 9C:
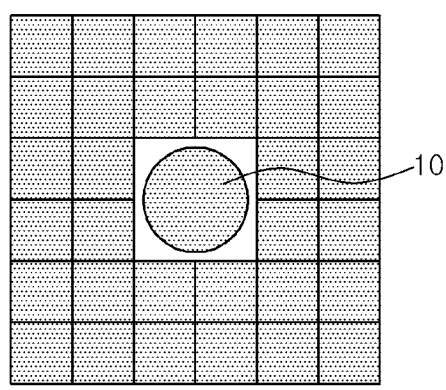

For example, when the detection area 10 has the pattern shown in FIG. 9A, the display terminal 4 turns on a light-emitting element corresponding to the lowest light transmitting portion 450, as shown in FIG. 5A. In addition, when the detection area 10 has the pattern shown in FIG. 9B, the display terminal 4 turns on light-emitting elements corresponding to the lowest light transmitting portion 450 and the middle light transmitting portion 450, as shown in FIG. 5B. Further, when the detection area 10 has the pattern shown in FIG. 9C, the display terminal 4 turns on light-emitting elements corresponding to all of the light transmitting portions 450, as shown in FIG. 5C. As such, the display terminal 4 displays the detection area 10 on the display unit 45 stepwisely based on a size of the detection area 10.

As described above, in the load control system 1 in accordance with the present embodiment, the area data indicative of the detection area 10, which is set by the imaging sensor 2, is transmitted to the display terminal 4 through the transmission control device 5. Further, the display terminal 4 displays the detection area 10 on the display unit 45 based on the area data. Accordingly, the load control system 1 in accordance with the present embodiment allows a user to check the detection area 10 of the imaging sensor 2 by way of simply watching the display terminal 4. In other words, the load control system 1 in accordance with the present embodiment allows a user to easily check the detection area 10 of the imaging sensor 2.

In addition, as described above, in the load control system 1 in accordance with the present embodiment, although the display terminal 4 displays the detection area 10 on the display unit 45 in a stepwise manner, this is an optional feature.

Further, the display unit 45 is not limited to the configuration described above by referring to FIGS. 5A to 5C and may be configured with an LCD or an organic EL display, for example. This configuration is preferable in that the display terminal 4 can display the detection area 10 on the display unit 45, e.g., as the blocks Y11 to Y66 shown in FIG. 8B. In other words, the display terminal 4 may display the detection area 10 on the display unit 45 in a matrix form. This configuration is also an optional feature. Further, the number of the blocks used to display the detection area 10 is not limited to thirty-six (=6×6) but less or more number of the blocks may be used to display the detection area 10.

Figure 10A:
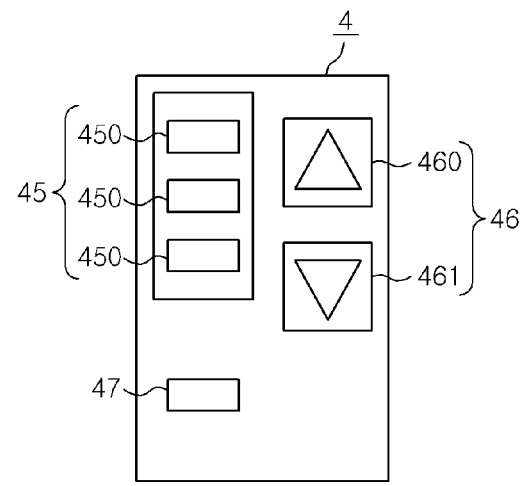
FIG. 10A is a schematic diagram illustrating another configuration of the display terminal in the load control system.
Figure 10B:
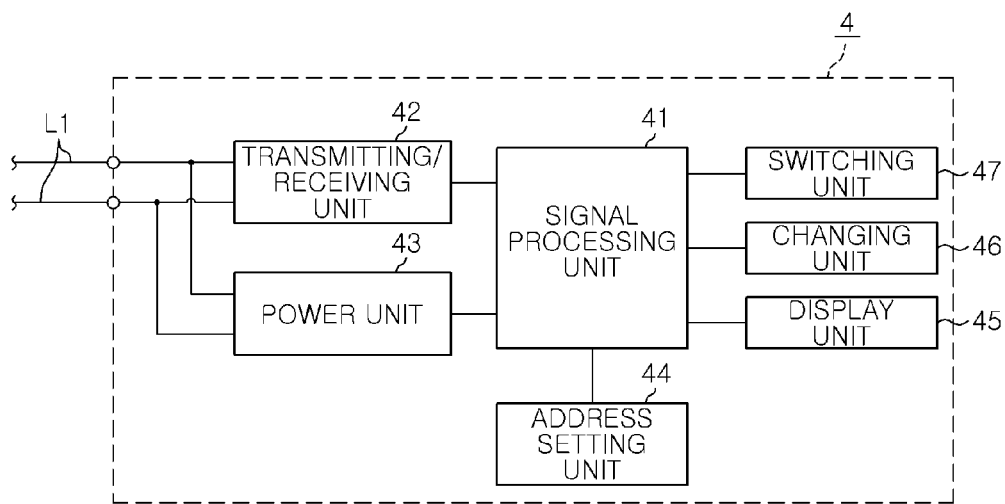
FIG. 10B is a block diagram illustrating another configuration of the display terminal.

In addition, the display terminal 4 may further include a changing unit 46 that generates change data to instruct to change the detection area 10 based on an input operation, as shown in FIGS. 10A and 10B. In the example shown in FIG. 10A, the changing unit 46 includes two switches 460 and 461. The switch 460 (e.g., a button switch) is to instruct to widen the detection area 10 and outputs an operation signal related thereto to the processing unit 41 when it is manipulated. The switch 461 (e.g., a button switch) is to instruct to narrow the detection area 10 and outputs an operation signal related thereto to the processing unit 41 when it is manipulated. Further, in the example shown in FIG. 10A, the display unit 45 has the same configurations as those shown in FIGS. 5A to 5C.

Now, a process to change the detection area 10 in the display terminal 4 will be described. It is assumed that the detection area 10 is pre-set in the pattern shown in FIG. 9B. Initially, a user manipulates the changing unit 46 to change the detection area 10 displayed on the display unit 45. By doing so, the changing unit 46 generates change data to instruct to change the detection area 10. For example, when the user manipulates the switch 460, the detection area 10 displayed on the display unit 45 is changed from the pattern shown in FIG. 9B into the pattern shown in FIG. 9C. Then, the changing unit 46 generates change data to instruct to change the detection area 10 into the pattern shown in FIG. 9C. For example, when the user manipulates the switch 461, the detection area 10 displayed on the display unit 45 is changed from the pattern shown in FIG. 9B into the pattern shown in FIG. 9A. Then, the changing unit 46 generates change data to instruct to change the detection area 10 into the pattern shown in FIG. 9A.

Once the changing unit 46 is manipulated, the display terminal 4 issues an interrupt signal. Upon recognizing the display terminal 4 in the interrupt polling mode, the transmission control device 5 sends a transmission signal S1 having the address data AD of the display terminal 4 to the signal line L1 in the monitoring mode. In response to the transmission signal S1, the display terminal 4 sends the change data within the signal-returning time WT. In other words, the display terminal 4 transmits a transmission signal S1 containing the change data to the transmission control device 5 through the signal line L1.

Subsequently, in the control mode, the transmission control device 5 having received the change data sends out a transmission signal S1 having the change data as the control data CD and the address of the imaging sensor 2 as the address data AD. In other words, the transmission control device 5 transmits the transmission signal S1 containing the change data transmitted from the display terminal 4 and the address data AD corresponding to the address of the imaging sensor 2 to the imaging sensor 2 through the signal line L1. Then, upon receiving the transmission signal S1, the imaging sensor 2 changes the detection area 10 based on the change data.

In this configuration, by using the display terminal 4, the user not only can check the detection area 10 but also can change the detection area 10 without using the setting device A1. This configuration is an optional feature. Additionally, in order to prevent for the user from erroneously touching the changing unit 46 to change the detection area 10, a confirmation switch for confirming validation or invalidation of the operation of the changing unit 46 may be provided. This feature is preferable in that the detection area 10 is not erroneously changed unless the operation of the changing unit 46 becomes valid by manipulating the confirmation switch.

Figure 11:
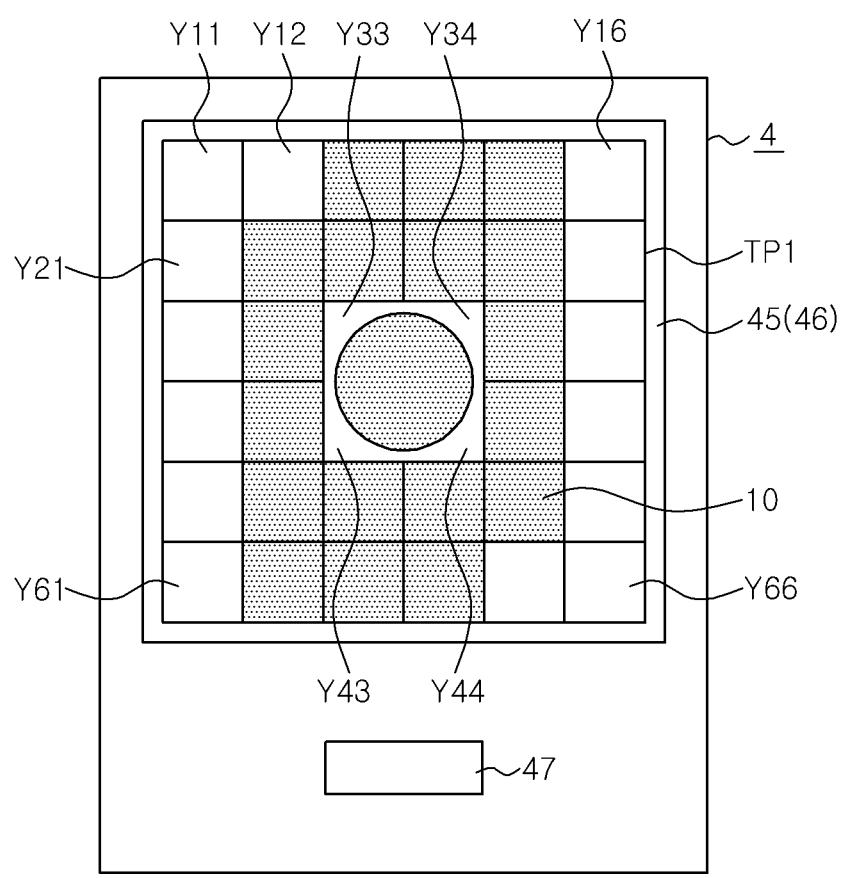
FIG. 11 is a schematic diagram illustrating still another configuration of the display terminal in the load control system.

Alternatively, as shown in FIG. 11, the display unit 45 may be configured as a touch panel TP1. Further, the changing unit 46 may generate change data based on an input operation received by the touch panel TP1. The touch panel TP1 displays thereon the blocks Y11 to Y66 in a resistive manner or a capacitive manner, for example. The user may select and touch one of the blocks Y11 to Y66, thereby designating the selected one as being effective or ineffective. By doing so, the changing unit 46 generates change data to instruct to change the detection area 10. Then, similarly to the above process, the change data is transmitted to the imaging sensor 2, and the imaging sensor 2 changes the detection area 10 based on the change data. This configuration is preferable in that the user can change the detection area 10 intuitionally.

The display terminal 4 may further include a switching unit 47 for switching an operation mode of the display unit 45 between a first mode in which the detection area 10 is displayed on the display unit 45 and a second mode in which a detection result of the imaging sensor 2 is displayed on the display unit 45, based on an input operation, as shown in FIGS. 10A and 10B. The switching unit 47 includes a single switch (a button switch, for example) and, when the switch is operated, outputs an operation signal related to the switch to the signal processing unit 41. In this example, the first mode and the second mode are switched alternately whenever operating the switch. However, without limited to the above configuration, e.g., the switching unit 47 may include two switches. In the example of two switches, the first mode is executed when one switch is operated and the second mode is executed when the other switch is operated.

Now, a process to switch the modes will be described. Once the switching unit 47 is operated, the display terminal 4 issues an interrupt signal. Upon recognizing the display terminal 4 in the interrupt polling mode, the transmission control device 5 sends a transmission signal S1 having the address data AD of the display terminal 4 to the signal line L1 in the monitoring mode. In response to the transmission signal S1, the display terminal 4 sends mode data indicative of a current-mode within the signal-returning time WT. In this manner, the transmission control device 5 can manage the current-mode of the display terminal 4.

Subsequently, the transmission control device 5 sets the area data as the control data CD when the current-mode is the first mode while it sets the monitor data as the control data CD when the current-mode is the second mode. Further, the transmission control device 5 sets the address of the display terminal 4 as the address data AD and sends out a transmission signal S1 having the set control data CD, the address data AD and the like. Then, upon receiving the transmission signal S1, the display terminal 4 displays the detection area 10 on the display unit 45 based on the area data when the current-mode is the first mode while it displays a detection result by the imaging sensor 2 on the display unit 45 based on the monitor data when the current-mode is the second mode.

Now, for the display unit 45 configured as shown in FIGS. 5A to 5C, displaying of a detection result by the imaging sensor 2 will be described. For example, when no human H1 exists in the detection area 10, the display terminal 4 turns on a light-emitting element associated with the lowest light transmitting portion 450 in FIG. 5A. Further, when a human H1 exists in the detection area 10, the display terminal 4 turns on a light-emitting element associated with the middle light transmitting portion 450 in FIG. 5A. Furthermore, when a human H1 is moving in the detection area 10, the display terminal 4 turns on a light-emitting element associated with the highest light transmitting portion 450 in FIG. 5A.

In this configuration, by using the display terminal 4, the user not only can check the detection area 10 but also can check a detection result by the imaging sensor 2. This configuration is an optional feature. Further, for the configuration in which the detection area 10 is displayed as the blocks Y11 to Y66, the monitor data may indicate whether or not a human H1 exists in each of the blocks of the detection area 10. With this monitor data, when a human H1 exists in, e.g., the block Y12, the display terminal 4 displays the block Y12 on the display unit 45 to be distinguished from the other blocks, e.g., by changing its color. In this instance, a user can check whether or not a human H1 exists in the detection area 10 in further detail.

In the load control system 1 in accordance with the present embodiment, the control terminal 3 controls a load based on the monitor data transmitted from the imaging sensor 2. Now, a process to control a load based on the monitor data will be described. The transmission control device 5 generates control data CD for controlling a load connected to the control terminal 3 corresponding to the imaging sensor 2 based on the monitor data transmitted from the imaging sensor 2. When the load is, e.g., a lamp load, the transmission control device 5 generates data for turning on the lamp load at its rated power as the control data CD, when the monitor data indicates that a human H1 is staying. Further, the transmission control device 5 generates data for dimming the lamp load as the control data CD, when the monitor data indicates that a human H1 is moving. Further, the transmission control device 5 generates data for turning off the lamp load as the control data CD, when the monitor data indicates that no human H1 exists.

Subsequently, the transmission control device 5 transmits a transmission signal S1 containing the control data CD and the address data AD corresponding to the address of the control terminal 3 to the control terminal 3 through the signal line L1. Then, upon receiving the transmission signal S1, the control terminal 3 controls the relays 6 based on the control data CD to control the load. That is, the control terminal 3 controls the load based on the monitor data.

With this configuration, the control terminal 3 controls the load (lamp load) based on a detection result by the imaging sensor 2, and accordingly power consumption can be further saved. This configuration is an optional feature.

In addition, the display terminal 4 may also serve to perform a function of an existing device used in the load control system 1 (e.g., a dimmer for dimming a lamp load). This is preferable in that checking of the detection area 10 and the dimming of a lamp load can be carried out by a single device.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A load control system, comprising:
an imaging sensor configured to capture an image of a space to be detected and detect whether or not a human exists only in a detection area, wherein the image is formed of a plurality of blocks, each of the blocks being designated as an effective block or an ineffective block depending on whether or not a human is allowed to exist therein, and wherein the detection area is formed of effective blocks in which a human is allowed to exist;
a display terminal including a display unit configured to display detection area information corresponding to the detection area thereon; and
a transmission control device to which the imaging sensor and the display terminal are connected through a two-wire signal line,
wherein the imaging sensor is configured to transmit a transmission signal containing area data indicative of the detection area to the transmission control device through the two-wire signal line,
wherein the transmission control device is configured to transmit a transmission signal which contains the area data and address data corresponding to an address of the display terminal to the display terminal through the two-wire signal line, and wherein the display terminal is configured to display the detection area information on the display unit based on the area data.

2. The load control system of claim 1, wherein the display terminal is configured to display the detection area on the display unit stepwisely based on a size of the detection area.

3. The load control system of claim 1, wherein the detection area information includes image blocks arranged in a matrix form, the image blocks corresponding to blocks of the detection area.

4. The load control system of claim 1, wherein the display terminal further includes a changing unit configured to generate change data based on an input operation of the changing unit, wherein the display terminal is configured to transmit a transmission signal containing the change data to the transmission control device through the two-wire signal line, wherein the transmission control device is configured to transmit a transmission signal which contains the change data and address data corresponding to an address of the imaging sensor to the imaging sensor through the two-wire signal line, and wherein the imaging sensor is configured to change the detection area based on the change data.

5. The load control system of claim 4, wherein the display unit contains a touch panel, and wherein the changing unit is configured to generate the change data based on the input operation received through the touch panel.

6. The load control system of claim 1, wherein the display terminal further includes a switching unit configured to switch an operation mode of the display unit between a first mode in which the detection area information is displayed on the display unit and a second mode in which a detection result of the imaging sensor is displayed on the display unit based on an input operation of the switching unit.

7. The load control system of claim 1, further comprising:

a control terminal configured to control a load connected thereto, wherein the imaging sensor is configured to transmit another transmission signal containing monitor data indicative of a detection result of the imaging sensor to the transmission control device through the two-wire signal line, wherein the transmission control device is configured to generate control data for the load based on the monitor data and to transmit a transmission signal which contains the control data and address data corresponding to an address of the control terminal to the control terminal through the two-wire signal line, and wherein the control terminal is configured to control the load based on the control data.

* * * * *